(12) United States Patent
Sentani et al.

(10) Patent No.: US 7,232,534 B2
(45) Date of Patent: Jun. 19, 2007

(54) METHOD OF PRODUCING A MOLDED PRODUCT COMPRISING AN INSERT

(75) Inventors: Haruki Sentani, Hiroshima (JP); Koji Tanaka, Hiroshima (JP)

(73) Assignee: Nishikawa Rubber Co., Ltd., Hiroshima-Ken (JP)

( * ) Notice: Subject to any disclaimer, the term of this patent is extended or adjusted under 35 U.S.C. 154(b) by 282 days.

(21) Appl. No.: 10/623,253

(22) Filed: Jul. 18, 2003

(65) Prior Publication Data

US 2004/0048043 A1 Mar. 11, 2004

(30) Foreign Application Priority Data

Sep. 5, 2002 (JP) ............................. 2002-260483

(51) Int. Cl.
*B29C 45/14* (2006.01)
(52) U.S. Cl. ....................................... 264/138; 264/275
(58) Field of Classification Search ................ 264/138, 264/275
See application file for complete search history.

(56) References Cited

U.S. PATENT DOCUMENTS

| | | | | |
|---|---|---|---|---|
| 2,197,465 A | * | 4/1940 | Brunetti | .................. 264/229 |
| 2,351,329 A | * | 6/1944 | Gerstenmaier | .............. 264/138 |
| 2,976,573 A | * | 3/1961 | Davis | ........................ 264/161 |
| 4,448,324 A | | 5/1984 | Jeppsson et al. | |
| 4,987,666 A | | 1/1991 | Smith | |
| 5,125,528 A | | 6/1992 | Heyn et al. | |
| 5,650,115 A | | 7/1997 | Proos et al. | |
| 5,955,017 A | * | 9/1999 | Foffano et al. | ............. 264/161 |

FOREIGN PATENT DOCUMENTS

| | | |
|---|---|---|
| FR | 2827805 A | 1/2003 |
| GB | 695420 | 8/1953 |
| JP | A-53-12960 | 1/1940 |
| JP | B-40-309 | 1/1940 |
| JP | 03277513 A | * 12/1991 |
| JP | 10315787 A | * 12/1998 |
| JP | 2000280756 A | * 10/2000 |

OTHER PUBLICATIONS

Office Action mailed Oct. 18, 2005 in a counterpart Japanese patent application and English translation thereof.

* cited by examiner

*Primary Examiner*—Edmund H. Lee
(74) *Attorney, Agent, or Firm*—Frishauf, Holtz, Goodman & Chick, P.C.

(57) ABSTRACT

There is provided a molded product 1 which is formed by placing an insert 3 in a molding space 12 formed by an upper die 10 and a lower die 11, followed by an injection process of molding material to form a molded body 2. The insert 3 is comprised of an insert body 4 which is embedded in the molded body 2 and a removing part 5 which is integrally formed with the insert body 4 via a thin part 6 at one end while the other end is projected to expose at a non-front surface 9 side. The removing part 5 functions to prevent the insert body 4 from moving from its proper position as the other end is firmly held between the upper die 10 and the lower die 11 during a molding operation. The removing part 5 is removed from the insert body 4 by cutting the thin part 6 after released from the die mold.

2 Claims, 3 Drawing Sheets

METHOD OF PRODUCING A MOLDED PRODUCT COMPRISING AN INSERT

FIELD OF THE INVENTION

This invention relates to a molded product made of rubber or resin comprising an insert therein such as a molded part of a weather strip for a car.

BACKGROUND OF THE INVENTION

There has been formed a molded product by placing an insert in a molding space created between an upper die and a lower die followed by a process of injecting melted rubber in the space. The molded product includes such, for example, as a molded part of a weather strip for a car which is made of rubber comprising a resin made insert embedded therein.

In this prior art, there was a drawback in the molding operation: that is, the resin made insert often moved from its proper position while the melted rubber is injected in the molding space for such reasons that the insert is lightweight, etc., thereby exposing itself out of the molded product.

In order to overcome such drawback, there was projectingly provided a pin 24 at a front surface (exposed surface) side 8 of an upper die 10 for contacting with an insert 22 (see FIG. 6 and 7), or there was provided a projection 23 at the front side 8 of the insert 22 for contacting with the upper die 10 (see FIG. 8 and 9), thereby preventing a movement of the insert 22 during the injection molding of the melted rubber.

However, according to a molded product 20 formed by the former prior art wherein the pin 24 was provided at the front surface 8 side of the upper die 10, there formed a groove 7 at a portion of a molded body 21 where the pin 24 had originally located, thereby impairing an appearance of the molded product.

Further, according to a molded product 20 formed by the latter prior art wherein the projection 23 was provided at the front surface 8 side of the insert 22, an appearance of the molded product was impaired like the former prior art as the top end of the projection 23 exposed at the front surface 8 side of the molded product.

Especially, when the color of the insert 22 differs from that of the rubber (black), the exposed part was emphasized and the appearance of the molded product was further impaired.

Moreover, according to the former prior art, the movement of the insert 22 was prevented merely by a contact force generated by the pin 24 and the insert 22, whereas according to the latter prior art, it was done so merely by a contact force of the projection 23 and the insert 22, therefore there was still a risk that the insert 22 moves from its proper position.

At the same time, in the former prior art, there needed to enlarge a diameter of the pin in order to expand a contact area between the pin 24 and the insert 22, so that the groove 7 became larger in size and which was a cause to further impairing the appearance of the molded product.

Therefore, it is an object of this invention to provide a molded product which is good in appearance by providing a structure capable of preventing a formation of a groove at a front surface side of a molded product and an exposure of an insert, while providing a structure capable of firmly holding the insert in a molding space.

SUMMARY OF THE INVENTION

In order to overcome the drawbacks raised above, an invention claimed in claim 1 provides a molded product (1) which is formed by placing an insert (3) in a molding space (12) formed by an upper die (10) and a lower die (11), followed by an injection process of molding material to form a molded body (2). The insert (3) is comprised of an insert body (4) which is embedded in the molded body (2) and a removing part (5) which is integrally formed with the insert body (4) via a thin part (6) at one end while the other end is projected to expose at a non-front surface 9 side. The removing part (5) functions to prevent the insert body (4) from moving from its proper position as the other end is firmly held between the upper die (10) and the lower die (11) during a molding operation. The removing part (5) is removed from the insert body (4) by cutting the thin part (6) after released from the die mold.

According to an invention claimed in claim 2, a molded product (1) is formed by placing an insert (3) in a molding space (12) formed by an upper die (10) and a lower die (11), followed by an injection process of molding material to form a molded body (2). The insert (3) is comprised of an insert body (4) which is embedded in the molded body (2) and a removing part (5) which is integrally formed with the insert body (4) via a cutting line or cutting ditch (6) at one end while,the other end is projected to expose at a non-front surface 9 side. The removing part (5) functions to prevent the insert body (4) from moving from its proper position as the other end is firmly held between the upper die (10) and the lower die (11) during a molding operation. The removing part (5) is removed from the insert body (4) by cutting the cutting line or the cutting ditch (6) after released from the die mold.

Numerals in parentheses indicate corresponding elements or matters signified in the drawings or under-mentioned embodiments of the invention.

According to a molded product comprising an insert in this invention, the insert is comprised of an insert body and a removing part integrally formed with the insert body projectingly provided at a non-front surface side of the molded part, so that there can be formed a groove at a non-front surface (unexposed surface) side of the molded product after removing the removing part.

Therefore, the groove is not visualized from outside and an appearance of the molded product can improve.

Further, one end of the removing part is firmly held by an upper die and a lower die during a molding operation, so that it is able to prevent the insert body from moving from its proper position.

Therefore, it can prevent the insert body from being exposed out of the molded product.

Moreover, the removing part is held between the upper die and the lower die, so that it is able to firmly hold the insert body and that a diameter of the removing part can be slimed.

Therefore, it is able to make the groove smaller in size as well, which is formed in the molded body.

DESCRIPTION OF PREFERRED EMBODIMENT

Figure 1:
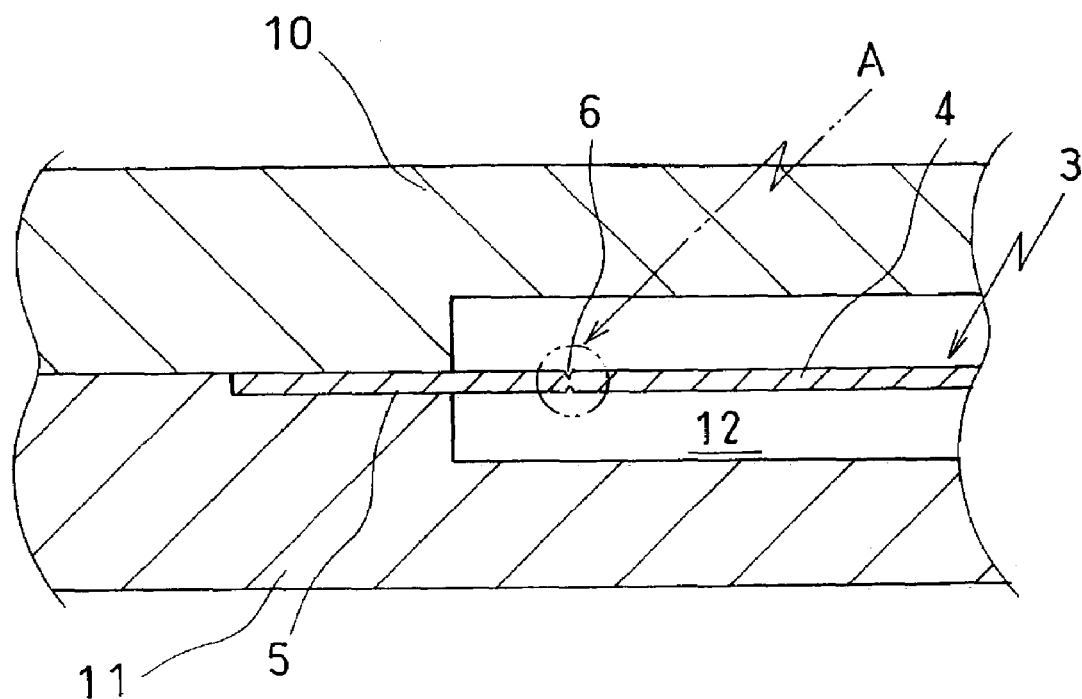
FIG. 1 is a sectional view showing a molding process of a molded product comprising an insert according to an embodiment of the invention.
Figure 2:
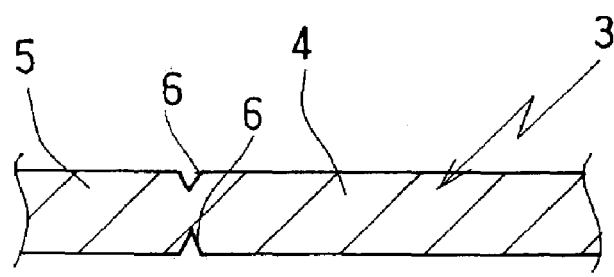
FIG. 2 is an enlarged view of section "A" in FIG. 1.
Figure 3:
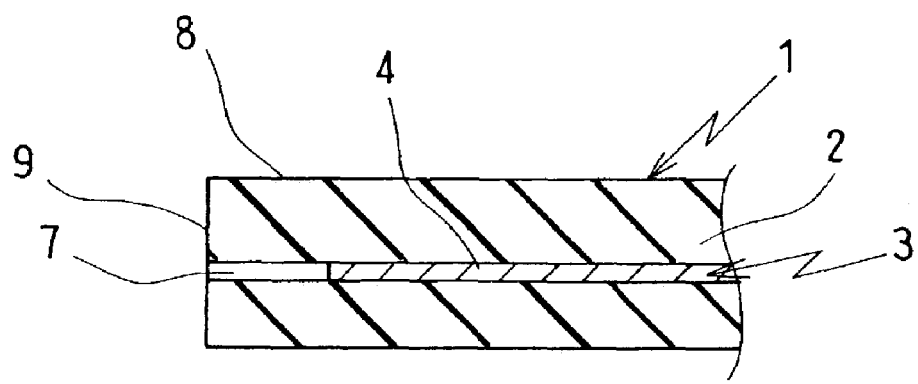
FIG. 3 is a sectional view showing a molded product comprising an insert according to an embodiment of the invention.

Referring to FIGS. 1 to 3, a molded product comprising an insert according to an embodiment of the invention will be described hereinafter. FIG. 1 is a sectional view showing a molding process of a molded product 1 comprising an insert, and FIG. 2 is an enlarged sectional view showing a portion indicated with "A" in FIG. 1. FIG. 3 is a sectional view showing a molded product 1 comprising an insert according to an embodiment of the invention. Same numerals are used for portions similar to those of prior arts.

A molded product 1 comprising an insert according to an embodiment of the invention is formed in such that an insert 3 made of resin material is placed in a molding space 12 which is provided by an upper die 10 and a lower die 11, then melted rubber is injected in the molding space 12 to form a molded body 2 while embedding the insert 3 in the molded body 2.

The insert 3 comprises an insert body 4 which is embedded in the molded body 2 and a removing part 5 which is integrally formed with the insert body 4 at its one end (the side which is orthogonal to the front surface 8 side) comprising a thin part 6 between the insert body 4 and the removing part 5. One end of the removing part 5 is integrally connected to the insert body 4 via the thin part 6, while the other end of the removing part 5 projects at a non-front surface (unexposed surface side) 9 side which is not seen from outside.

One end of the removing part 5 is firmly held by the upper die 10 and the lower die 11 during a molding process, so that it is able to firmly hold the insert body 4 and prevent the insert body 4 from moving from its proper position. Therefore, the insert body 4 does not move by a pressure force of injected rubber during the molding process, and so it can prevent the insert body 4 from being exposed partially out of the molded product 1.

Further, the removing part 5 is easily removed from the insert body 4 after released from the die mold by cutting the thin part 6 with a force of such as hands which is applied in a back-and-forth or left-and-right directions.

After detaching the removing part 5 from the molded body 2, a groove 7 is formed at the portion where the removing part 5 existed. However, this groove 7 is present at the non-front side 9 which is not seen from outside, so that a good appearance of the molded product 1 can be maintained.

Further, it is able to firmly hold the insert body 4 by holding the removing part 5 between the upper die 10 and the lower die 11, so that a diameter of the removing part 5 can be reduced, and that the groove 7 formed in the molded body 2 can be also reduced in size.

Figure 4:
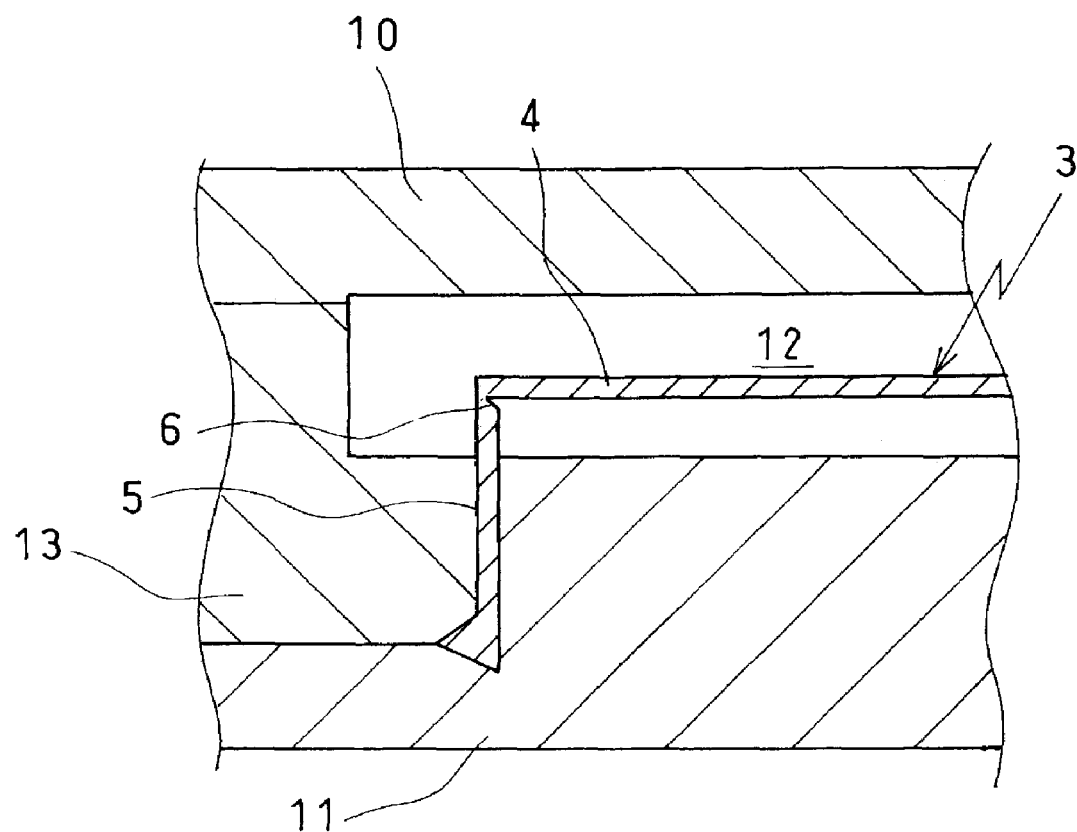
FIG. 4 is a sectional view showing a molding process of a molded product comprising an insert according to another embodiment of the invention.
Figure 5:
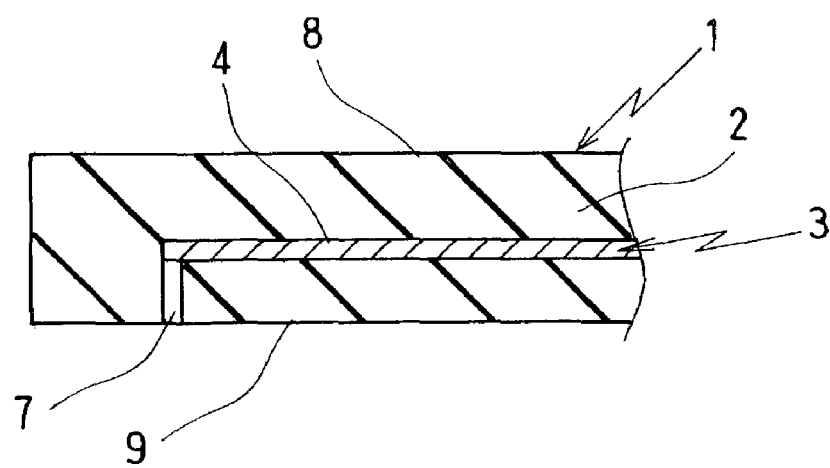
FIG. 5 is a sectional view showing a molded product comprising an insert according to another embodiment of the invention.
Figure 6:
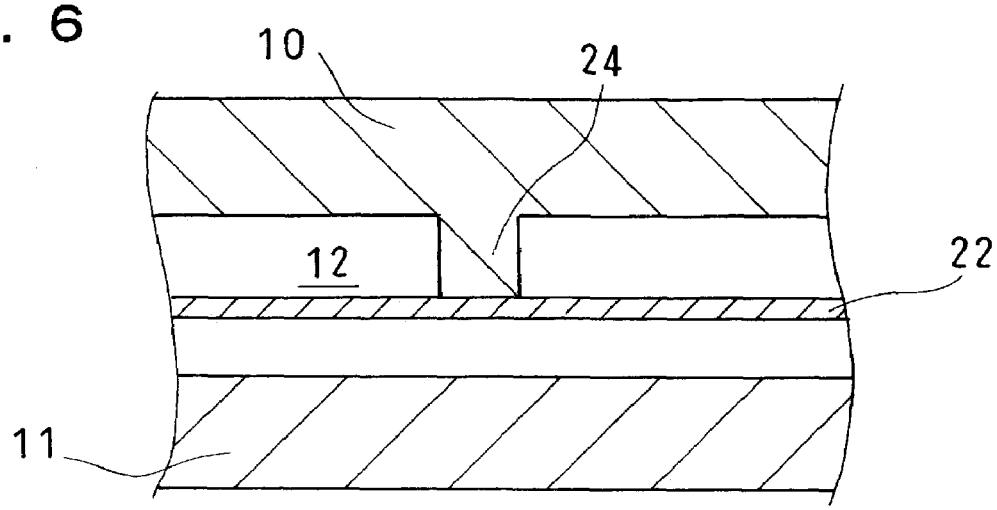
FIG. 6 is a sectional view showing a molding process of a molded product comprising an insert according to a prior art.
Figure 7:
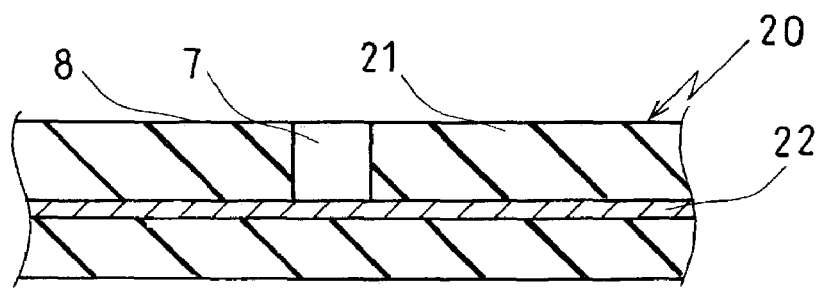
FIG. 7 is a sectional view showing a molded product comprising an insert according to a prior art.
Figure 8:
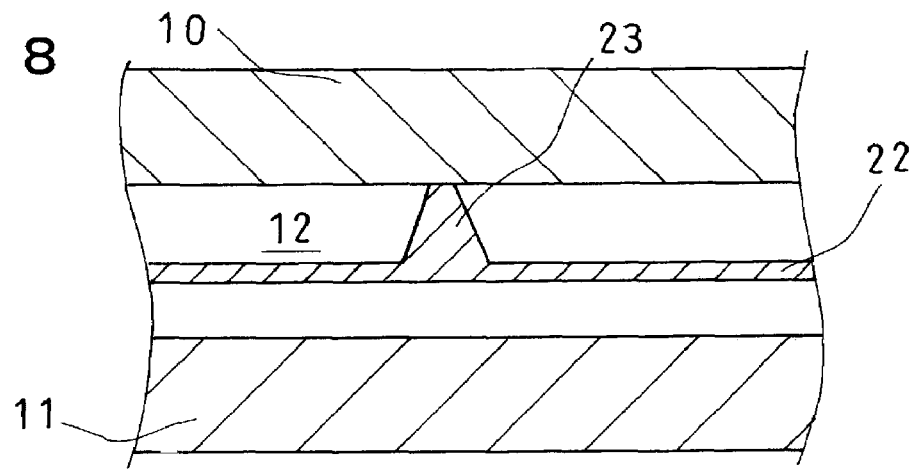
FIG. 8 is a sectional view showing a molding process of a molded product comprising an insert according to another prior art.
Figure 9:
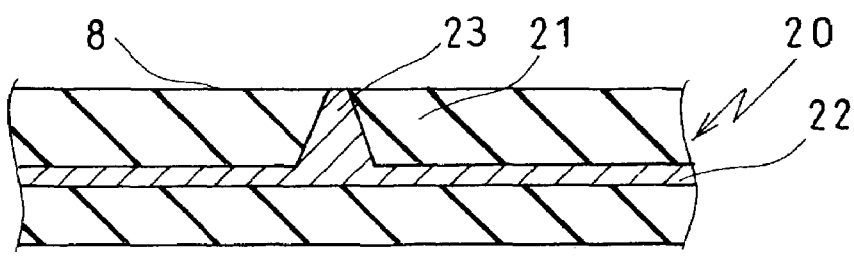
FIG. 9 is a sectional view showing a molded product comprising an insert according to another prior art.

The configuration and position of the removing part 5 is not limited to those as shown in the above-mentioned embodiment, and as illustrated in FIGS. 4 and 5, it may be projected from one end of the insert body 4 toward the opposed side of the front surface 8.

In this case, the removing part 5 is also projected to the non-front surface (unexposed surface) 9 side which is not seen from outside, so that the groove 7 formed at the position where the removing part 5 formally took place is not seen from outside. Further, the removing part 5 is firmly held by the upper die 10 and the lower die 11, so that it is able to prevent the insert body 4 from moving from its proper position during the molding operation.

FIG. 1 illustrates a molding die which is divided into two parts where an inset 3 is held between an upper die 10 and a lower die 11. FIG. 4 illustrates a molding die which is divided into three parts where an insert 3 is held by a middle die 13 and a lower die 11. Although it is not illustrated, an insert can be held by an upper die 10 and a middle die 13 in the die mold which is divided into three parts.

According to the above-mentioned embodiment of the invention, the removing part 5 and the insert body 4 are integrally formed comprising the thin part 6 between them in order to perform an easy removing operation. In stead of such structure, the removing part 5 and the insert body 4 may be integrally formed via a cutting line (which is not shown) or a cutting ditch (which is not shown either) in order for an easy removing operation as well.

Further, FIG. 2 illustrates an example embodiment of an insert 3 in which grooves are formed on both sides of the insert 3 in order to form a thin part 6, while FIG. 4 illustrates an insert 3 in which a groove is formed at one side of the insert 3 forming a thin part 6. Although the groove may be formed in one side or both sides of the insert 3, it is preferable to make the thin part 6 having a thickness approximately one half of the rest (where the thin part 6 is not formed) of the insert 3.

Moreover, according to the embodiment of the invention, there is used rubber material as molding material, though resin material may be used as the molding material as well.

Further, the above-mentioned embodiment merely discloses the resin made insert, however the insert 3 may be made of metal if it satisfies concerns of a production cost and a prevention of rust.

According to a molded product comprising an insert in the invention, an insert is comprised of an insert body and a removing part which is integrally formed with the insert body at an non-front surface side, so that it is able to place a groove, which is formed in a molded body after the removing part is removed, at a non-front surface side. Therefore, an appearance of the molded product improves.

Further, one end of the removing part is firmly held by an upper die and a lower die during a molding operation, so that it is able to prevent the insert body from moving from its proper position. Therefore, it can prevent the insert body from being exposed out of the molded product.

Moreover, the insert body can be firmly held by holding the removing part by the upper die and the lower die, so that a diameter of the removing part can be reduced. Therefore, it can make a groove smaller in size, which is formed in the molded body, and improve an appearance of the molded product.

We claim:

1. A method of producing a molded product of a weather strip for an automobile comprising placing an insert which includes an insert body; and a removing part which is integrally formed with the insert body and coupled to the insert body via a thin part at a first end while a second end is projected to expose at a non-front side in a molding space formed by an upper die and a lower die, followed by injection molding material to form the molded body, comprising the steps of:

firmly holding the second end of the removing part between the upper die and the lower die in a closed position to prevent the insert body from moving during a molding operation;

injecting melted rubber in the molding space thereby molding the molded body, wherein the inner body, the thin part, and a portion of the removing part is embedded in the molded body; and removing the removing part from the insert body by cutting the thin part after being released from the upper die and lower die, thereby forming a groove at the position where the removing part existed, wherein said groove is positioned at a non-front side surface of the molded part which is not seen from outside.

2. A method of producing a molded product of a weather strip for an automobile comprising placing an insert which includes an insert body embedded in the molded body; and a removing part which is integrally formed with the insert body and coupled to the insert body via a cutting line or cutting ditch at a first end while a second end is projected to expose at a non-front surface side in a molding space formed by an upper die and a lower die, followed by injection molding material to form the molded body, comprising the steps of:

firmly holding the second end of the removing part between the upper die and the lower die in a closed position to prevent the insert body from moving during a molding operation;

injecting melted rubber in the molding space thereby molding the molded body, wherein the inner body, the cutting line or cutting ditch, and a portion of the removing part is embedded in the molded body; and removing the removing part from the insert body by cutting the cutting line or the cutting ditch after being released from the upper die and lower die;

forming a groove thereby at the position where the removing part existed, wherein said groove is positioned at a non-front side surface which is not seen from outside.

\* \* \* \* \*